Dec. 16, 1952  E. LISOTA  2,621,814
ADJUSTABLE TILTING BED FOR TRUCKS
Filed June 20, 1950  2 SHEETS—SHEET 1
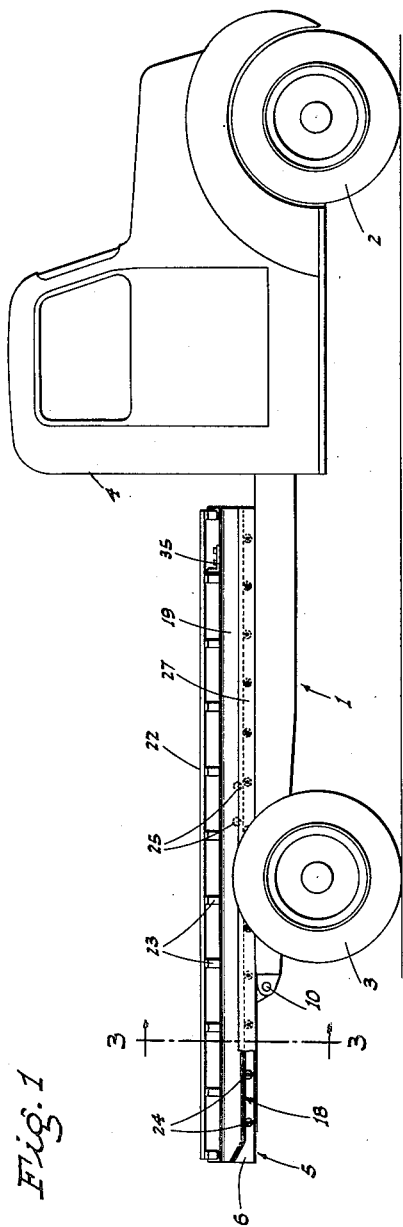
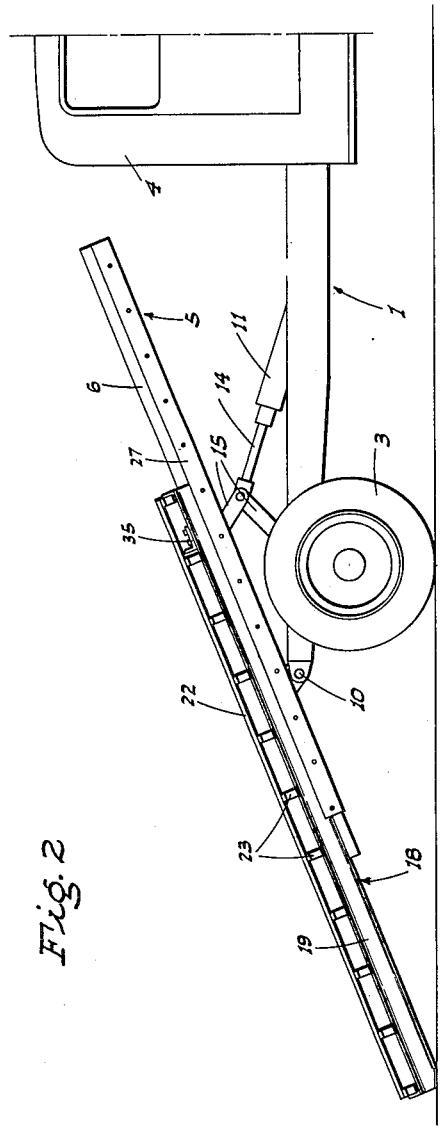
Inventor
Edward Lisota
By
ATTORNEYS

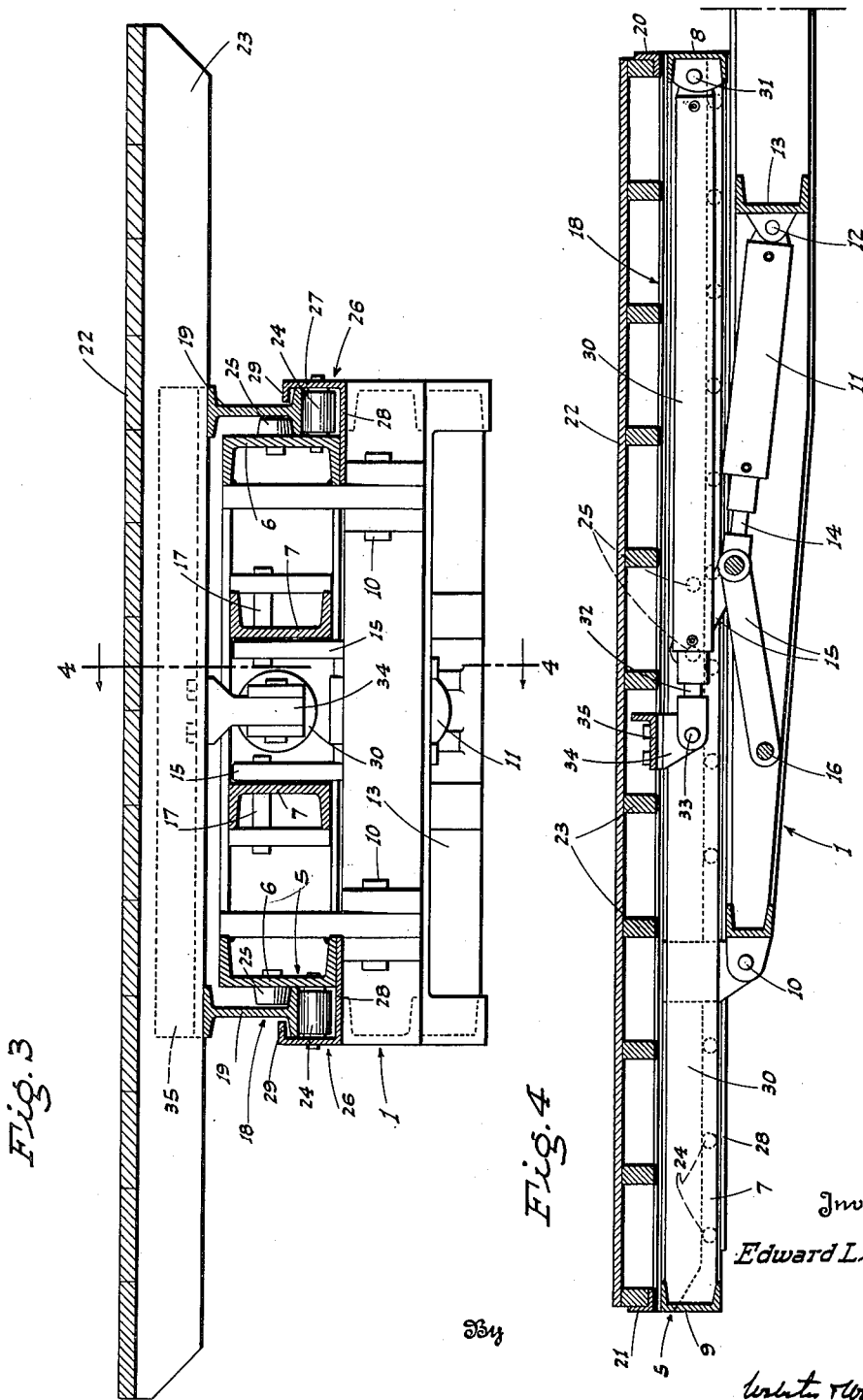

Patented Dec. 16, 1952

2,621,814

UNITED STATES PATENT OFFICE 2,621,814

ADJUSTABLE TILTING BED FOR TRUCKS

Edward Lisota, Patterson, Calif.

Application June 20, 1950, Serial No. 169,174

2 Claims. (Cl. 214—85)

This invention is directed to, and it is a major object to provide, a novel bed assembly for trucks; said bed assembly being tiltable between a horizontal load carrying position and a rearwardly and downwardly inclined position for direct loading from the ground.

Another important object of the invention is to provide a truck bed assembly, as above, which includes a tilting bed hinged to the main frame of the truck, and a sliding bed mounted on said tilting bed whereby when the latter is rearwardly tilted, the sliding bed may be run rearward into ground engagement for a loading operation; both beds being selectively power actuated.

An additional object of the invention is to provide a novel slide mounting between the tilting bed and sliding bed; such slide mounting being designed to permit the invention to be readily and conveniently adapted to standard dump truck bed structures.

A further object of the invention is to provide a truck bed assembly designed for ease and economy of manufacture; the structure being relatively simple but rugged.

Still another object of the invention is to provide a practical and reliable truck bed assembly, and one which will be exceedingly effective for the purpose for which it is designed.

These objects are accomplished by means of such structure and relative arrangement of parts as will fully appear by a perusal of the following specification and claims.

In the drawings,

Fig. 1 is a side elevation of a truck embodying the invention; the bed assembly being shown in its horizontal, transport position.

Fig. 2 is a similar view but shows the bed assembly in its tilted and extended position for loading.

Fig. 3 is an enlarged transverse section on line 3—3 of Fig. 1.

Fig. 4 is a longitudinal section on line 4—4 of Fig. 3.

Referring now more particularly to the characters of reference on the drawings, the invention is here shown as embodied in a truck which includes a longitudinal main frame 1 supported by front wheels 2 and rear wheels 3; the truck including a cab 4, and the main frame 1 being initially exposed rearwardly of said cab.

A tilting bed, indicated generally at 5, extends lengthwise above the main frame 1, being in a normally horizontal position and mainly overlying said main frame 1.

The tilting bed 5 includes longitudinal side beams 6 and longitudinal intermediate beams 7, with said beams 6 and 7 connected by a front cross beam 8 and a rear cross beam 9.

Adjacent but short of its rear end the tilting bed 5 is pivoted or hinged, as at 10, to the rear end of the main frame 1 for upward and rearward swinging motion of said tilting bed from its normally horizontal transport position, as in Fig. 1, to an inclined position, as in Fig. 2.

The tilting bed 5 is adapted to be so swung or tilted by means of a longitudinal power cylinder 11 pivoted, at its forward end, as at 12, to a cross beam 13 of the main frame 1. A piston rod 14 projects from the other end of the power cylinder and actuates an articulated lifting linkage 15 pivotally connected at one end, as at 16, to the main frame, and pivotally connected at the other end, as at 17, to the tilting bed 5 intermediate its ends and ahead of the hinges 10. The tilting bed 5 and the tilt control mechanism therefor, including the power cylinder 11, may be generally of the type which is used on dump trucks.

The tilting bed 5 supports a sliding bed, indicated generally at 18; such sliding bed including longitudinal side beams 19 of I-shape in cross section, with said side beams connected, at opposite ends, by a front cross beam 20 and a rear cross beam 21.

A relatively wider load supporting platform 22 is secured on the sliding bed 18 by means including a plurality of cross beams 23.

The sliding bed 18 and the load supporting platform 22 thereon are substantially the same length as the tilting bed 5, and normally occupy a horizontal, fully advanced position on the latter; the sliding bed 18 being mounted in connection with the tilting bed 5 in the following manner:

Each of the longitudinal side beams 19, of I-configuration, rest on a longitudinal row of bottom rollers 24 which are mounted in connection with, and project laterally outwardly from, the side beams 6; the bottom flanges of the side beams 19 riding said rollers 24 and being held against upward displacement by corresponding rows of hold-down rollers 25 likewise mounted on the side beams 6. Each row of the bottom rollers is supported, at its outer end, by a roller supporting and protective channel, indicated generally at 26. Each channel 26 includes an upstanding side flange 27 to which the rollers 24 are journaled, and a bottom plate which extends below the row of rollers 24 and is affixed to the under side of the corresponding side beam 6. Additionally, each channel 26 includes a lip 29 which overhangs the bottom flange of the corresponding side beam 19 in protective relation.

As so mounted the sliding bed 18 is capable of rearward sliding motion from a fully advanced position, as in Fig. 1, to a rearwardly extended position, as in Fig. 2. Upon upward swinging of the tilting bed 5, and rearward extension of the sliding bed 18, the latter comes into ground engagement as in Fig. 2, whereby to facilitate placement of a load on the platform 22.

The sliding bed 18 is actuated, between its respective positions, by means of an elongated power cylinder 30 which lies lengthwise within the confines of the tilting bed 5 between the intermediate longitudinal beams 7 thereof. At one end thereof the power cylinder 30 is connected, as at 31, to the front cross beam 8 of the tilting frame, while at its outer end the piston rod 32 of said power cylinder is connected, as at 33, to a bracket 34 which depends from a transverse attachment bar 35 which spans between the side beams 19 of said sliding bed 18.

When the power cylinder 30 is contracted, the sliding bed 18 is advanced, while extension of the power cylinder 30 shifts said sliding bed rearward relative to the tilting bed 5.

The power cylinders 11 and 30 are connected to valve regulated, fluid pressure conduit systems (not shown) adapted for the selective and independent actuation of said cylinders.

With the particular design of the sliding bed 18, including the longitudinal side beams 19 in effect straddling the tilting bed 5; i. e. disposed laterally outwardly from the side beams 6, the novel truck bed assembly to which this invention is directed can be readily fabricated on a truck which includes a tilting bed. The arrangement of the rollers 24 and 25, together with the roller supporting and protective channel 26, further facilitates manufacture.

The described truck bed assembly makes possible ready, practical, and convenient loading from the ground, or from an elevated platform, as required; it being possible to slide the bed rearwardly, with the bed 5 either remaining horizontal or when the latter is tilted.

As the beds 5 and 18 are both power actuated, said beds can be adjusted to their respective positions without difficulty, even though a load rests upon the platform 22.

The described truck bed assembly is quite practical; its structure, while relatively simple, is sturdy; and there is nothing in the structure which requires more than ordinary maintenance and servicing.

In advanced or transport position of the sliding bed, and lowered position of the tilting bed, the load is carried directly on the longitudinal side beams of the main frame 1 of the truck, thus satisfying best engineering practice.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful, and upon which Letters Patent are desired:

1. In a truck which includes one bed having transversely spaced longitudinal side beams, a sliding bed on said one bed, power means between the beds operative to actuate the sliding bed, the sliding bed including transversely spaced longitudinal side beams disposed adjacent but laterally of the corresponding side beams of said one bed in overlapping relation to said beams, a longitudinal row of rollers on each of the latter beams, a longitudinal bottom plate on and projecting laterally from the side beams of said one bed below the rollers, an upstanding longitudinal flange on the free edge of each bottom plate, the corresponding rollers being journaled in connection with said upstanding flanges, the side beams of the sliding bed including a bottom flange and riding corresponding rows of rollers and facing the adjacent beam of said one bed, and, a row of hold-down rollers on each side beam of said one bed riding atop the bottom flanges of the adjacent beam.

2. In a truck which includes one bed having transversely spaced longitudinal side beams, a sliding bed on said one bed, power means between the beds operative to actuate the sliding bed, the sliding bed including transversely spaced longitudinal side beams disposed adjacent but laterally out from the corresponding side beams of said one bed in overlapping relation to said beams, a longitudinal row of rollers on each of the latter beams, a longitudinal bottom plate on and projecting laterally from the side beams of said one bed below the rollers, an upstanding longitudinal flange on the free edge of each bottom plate, the corresponding rollers being journaled in connection with said upstanding flanges, the side beams of the sliding bed being of I-shape and riding corresponding rows of rollers, a row of hold-down rollers on each side beam of said one bed riding atop the near bottom flanges of the adjacent I-shaped beam, and an inturned longitudinal lip on each upstanding flange overhanging the other bottom flange of the adjacent I-shaped beam.

EDWARD LISOTA.

REFERENCES CITED

The following references are of record in the file of this patent:

UNITED STATES PATENTS

| Number | Name | Date |
|---|---|---|
| 1,432,328 | Gee | Oct. 17, 1922 |
| 1,633,364 | Carvalho | June 21, 1927 |
| 1,755,803 | Anthony | Apr. 22, 1930 |
| 1,892,029 | Alexander | Dec. 27, 1932 |
| 2,143,291 | Wachter | Jan. 10, 1939 |
| 2,282,507 | Wachter | May 12, 1942 |
| 2,468,220 | McLendon | Apr. 26, 1949 |
| 2,509,167 | Pla | May 23, 1950 |
| 2,579,409 | White | Dec. 18, 1951 |

FOREIGN PATENTS

| Number | Country | Date |
|---|---|---|
| 510,234 | Great Britain | July 28, 1939 |